(12) United States Patent
Chen (10) Patent No.: US 8,939,506 B2
(45) Date of Patent: Jan. 27, 2015

(54) CARRIER FOR INFANT CAR SEAT (71) Applicant: Way-Hong Chen, Taipei (TW)

(72) Inventor: Way-Hong Chen, Taipei (TW)

( * ) Notice: Subject to any disclaimer, the term of this patent is extended or adjusted under 35 U.S.C. 154(b) by 32 days.

(21) Appl. No.: 13/891,242

(22) Filed: May 10, 2013

(65) Prior Publication Data
US 2014/0333106 A1 Nov. 13, 2014

(51) Int. Cl.
A47D 1/10 (2006.01)
B60N 2/28 (2006.01)

(52) U.S. Cl.
CPC .................... B60N 2/2821 (2013.01)
USPC ..................................... 297/256.16

(58) Field of Classification Search
USPC .......................... 297/250.1, 256.16
See application file for complete search history.

(56) References Cited

U.S. PATENT DOCUMENTS

| 6,010,184 | A * | 1/2000 | Lee et al. ....................... 297/130 |
| 6,764,135 | B2 * | 7/2004 | Sasaki et al. .............. 297/256.16 |
| 7,467,825 | B2 * | 12/2008 | Jane Santamaria ........... 297/253 |
| 7,624,954 | B2 * | 12/2009 | Randle et al. ................. 248/129 |
| 2002/0113469 | A1 * | 8/2002 | Stern et al. ............... 297/256.16 |
| 2008/0224515 | A1 * | 9/2008 | Cui et al. ................. 297/256.12 |
| 2008/0315647 | A1 * | 12/2008 | Carine ........................ 297/250.1 |
| 2009/0184547 | A1 * | 7/2009 | Sclare et al. ............... 297/217.1 |
| 2011/0227384 | A1 * | 9/2011 | Huntsberger et al. ...... 297/250.1 |
| 2012/0032483 | A1 * | 2/2012 | Hu ........................... 297/256.16 |

FOREIGN PATENT DOCUMENTS

| EP | 164909 A2 * | 12/1985 |
| EP | 619201 A1 * | 10/1994 |
| GB | 2281261 A * | 3/1995 |

* cited by examiner

Primary Examiner — Milton Nelson, Jr.
(74) Attorney, Agent, or Firm — Alan D. Kamrath; Kamrath IP Lawfirm, P.A.

(57) ABSTRACT

A carrier for an infant car seat includes a lower support unit, two pairs of position adjusting units connected with the lower support unit, two pairs of angle adjusting units connected with the position adjusting units, and a pair of upper support bars connected with the angle adjusting units. An infant car seat is placed and supported between the upper support bars. Thus, the carrier is used to fix and support the infant car seat and can be placed indoors and outdoors. In addition, the carrier can be directly taken out of the car to support the infant car seat, so that the user can place and carry the infant car seat easily and conveniently.

6 Claims, 8 Drawing Sheets

CARRIER FOR INFANT CAR SEAT

BACKGROUND OF THE INVENTION

1. Field of the Invention

The present invention relates to a carrying device and, more particularly, to a carrier for an infant car seat.

2. Description of the Related Art

A conventional infant car seat is mounted in a car to place and support an infant exactly in the car to protect the infant during movement of the car. However, the infant car seat is fixed in the car and cannot be taken out of the car, so that the user has to directly hold and take the infant out of the infant car seat when leaving the car, thereby causing inconvenience to the user. In addition, the angle of the infant car seat cannot be adjusted according to the practice requirement, thereby easily causing an uncomfortable sensation to the infant.

BRIEF SUMMARY OF THE INVENTION

In accordance with the present invention, there is provided a carrier for an infant car seat, comprising a lower support unit, two pairs of position adjusting units connected with the lower support unit, two pairs of angle adjusting units connected with the position adjusting units, and a pair of upper support bars connected with the angle adjusting units. The lower support unit includes two pairs of lower legs, two pairs of joints each connected with a respective one of the lower legs, and a pair of support rods each having two opposite ends each connected with a respective one of the joints. Each of the support rods of the lower support unit has a surface provided with a plurality of positioning holes. Each of the position adjusting units includes a movable block movably mounted on a respective one of the support rods of the lower support unit, a press knob pivotally mounted on the movable block, a positioning stub mounted on the press knob and detachably locked in one of the positioning holes of the respective support rod, a torsion spring biased between the movable block and the press knob, and a shaft extended through the movable block, the press knob and the torsion spring. The movable block of each of the position adjusting units is provided with a through hole mounted on the respective support rod of the lower support unit. The press knob of each of the position adjusting units is pushed by the torsion spring to move the positioning stub toward the positioning holes of the respective support rod. Each of the angle adjusting units includes a housing secured on the movable block of a respective one of the position adjusting units and provided with a first toothed groove, a rotation block rotatably connected with the housing and provided with a second toothed groove, a toothed wheel intermeshing with the first toothed groove of the housing and the second toothed groove of the rotation block, a compression spring biased between the housing and the toothed wheel to locate the toothed wheel between the first toothed groove of the housing and the second toothed groove of the rotation block, a push button movably mounted on the rotation block and provided with at least one pushing tang abutting the toothed wheel, and a mounting tube secured on the rotation block. The compression spring and the toothed wheel of each of the angle adjusting units are disposed between the housing and the rotation block. Each of the upper support bars has two opposite ends each connected with the mounting tube of a respective one of the angle adjusting units.

According to the primary advantage of the present invention, the carrier is used to fix and support the infant car seat and can be placed indoors and outdoors, thereby facilitating a user carrying and placing the infant car seat.

According to another advantage of the present invention, the carrier can be directly taken out of the car to support the infant car seat, so that the user can place and carry the infant car seat easily and conveniently.

According to a further advantage of the present invention, the angle of each of the upper support bars can be adjusted freely to adjust the angle of the infant car seat.

According to a further advantage of the present invention, the upper support bars are moved to adjust the distance between the upper support bars to fit the size of the infant car seat.

According to a further advantage of the present invention, each of the lower legs of the lower support unit can be folded to reduce the whole volume of the carrier when not in use.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-7, a carrier for an infant car seat in accordance with the preferred embodiment of the present invention comprises a lower support unit 1, two pairs of position adjusting units 2 connected with the lower support unit 1, two pairs of angle adjusting units 3 connected with the position adjusting units 2, and a pair of upper support bars 4 connected with the angle adjusting units 3.

Figure 1:
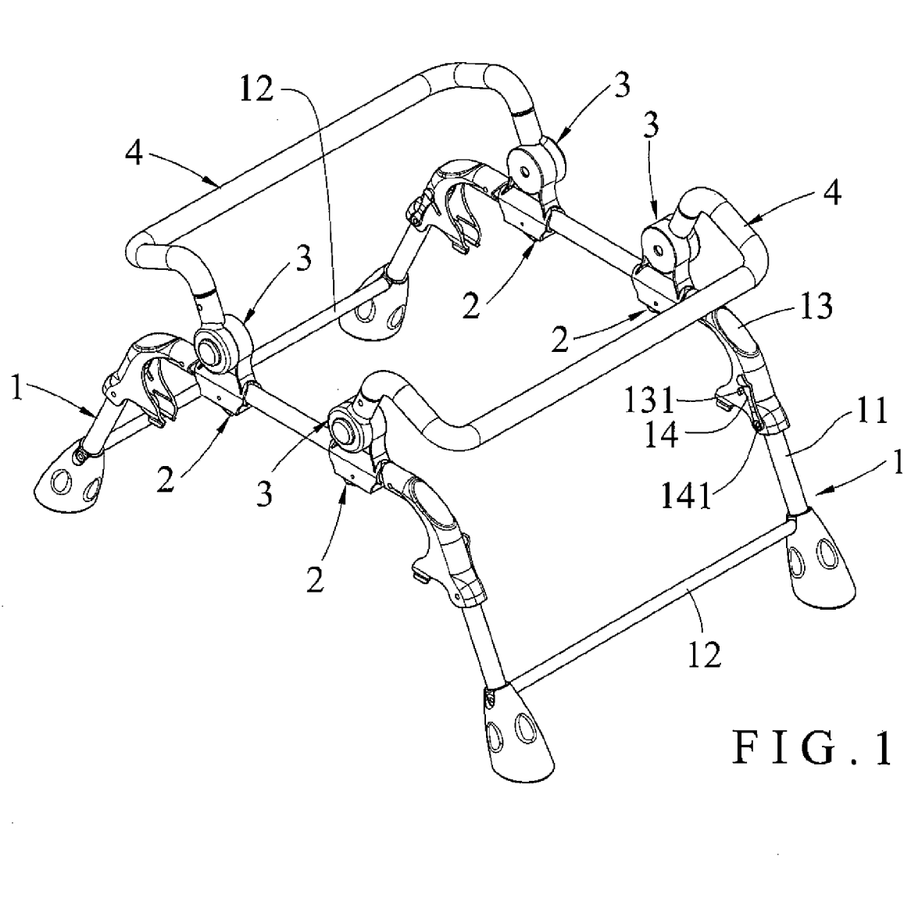
FIG. 1 is a perspective view of a carrier for an infant car seat in accordance with the preferred embodiment of the present invention.
Figure 2:
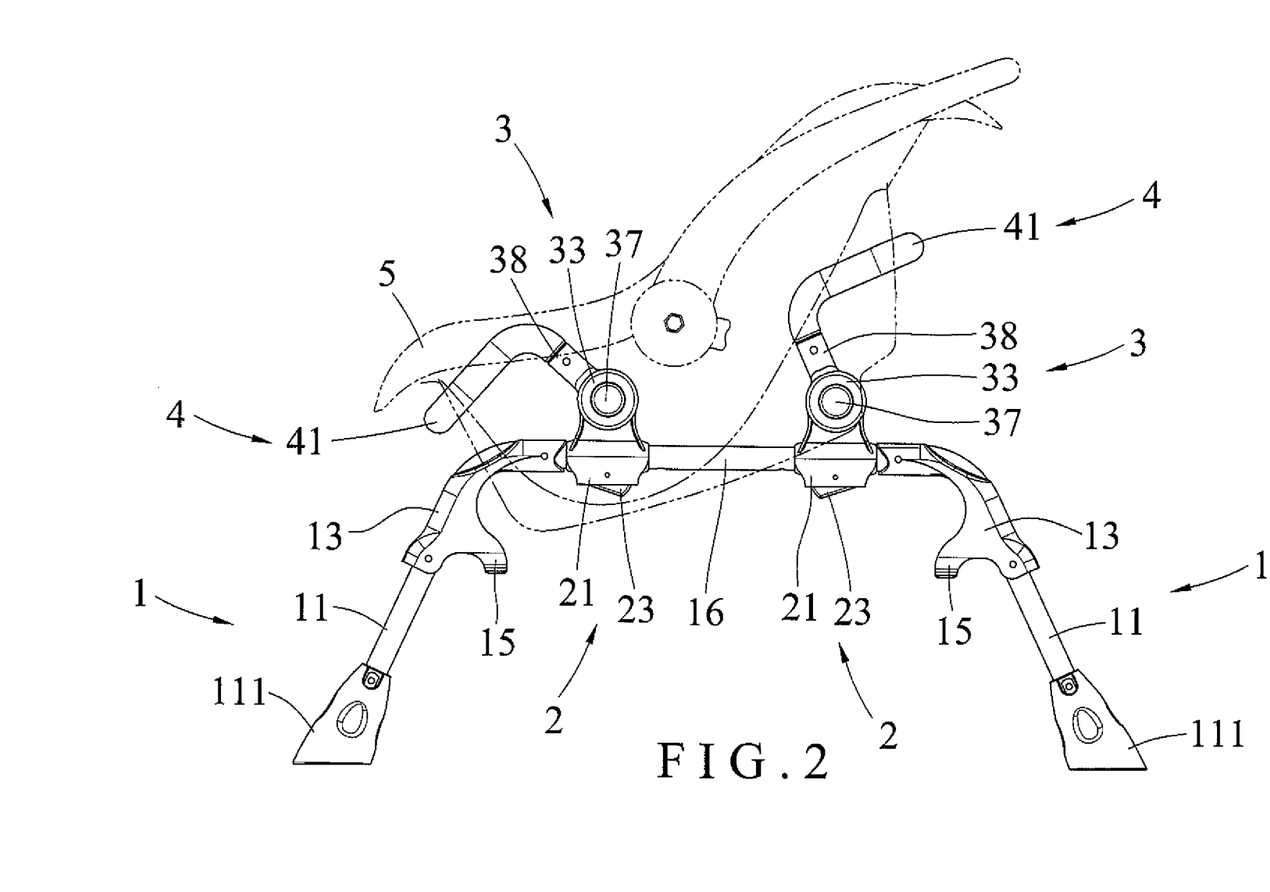
FIG. 2 is a front view of the carrier for an infant car seat as shown in FIG. 1.
Figure 3:
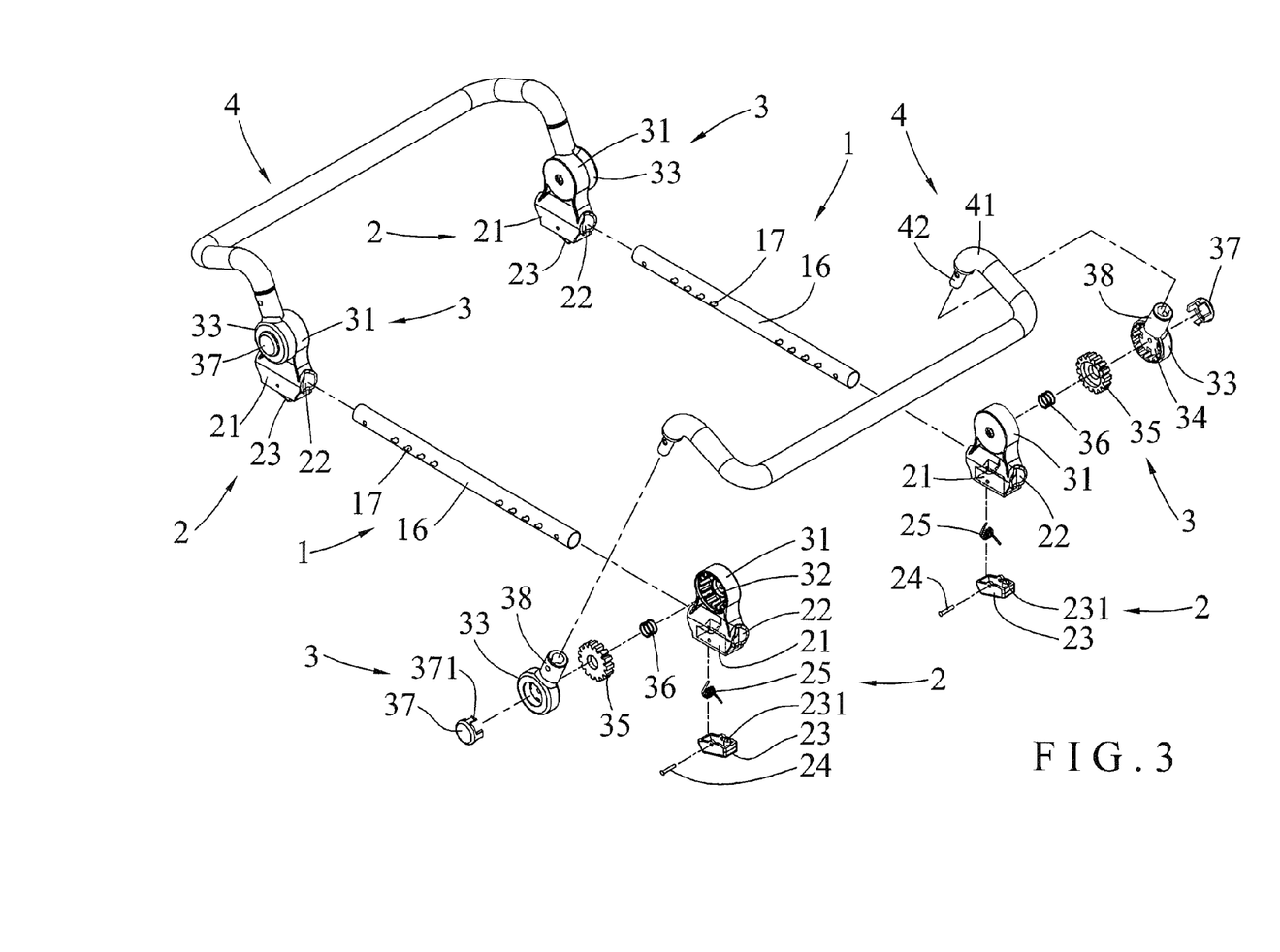
FIG. 3 is a partially exploded perspective view of the carrier for an infant car seat as shown in FIG. 1.

The lower support unit 1 includes two pairs of lower legs 11, two pairs of joints 13 each connected with a respective one of the lower legs 11, a pair of support rods 16 each having two opposite ends each connected with a respective one of the joints 13, and a pair of connecting rods 12 each having two opposite ends each connected with a respective one of the lower legs 11.

Each of the lower legs 11 of the lower support unit 1 has a tubular shape. Each of the lower legs 11 of the lower support unit 1 has an upper end provided with an elongate slot 112 and has a lower end provided with a conic stand 111. Each of the support rods 16 of the lower support unit 1 has a surface provided with a plurality of positioning holes 17. Each of the joints 13 of the lower support unit 1 has a surface provided with an arcuate slot 131 connected to the elongate slot 112 of the respective lower leg 11. Each of the joints 13 of the lower support unit 1 has a lower end pivotally connected with the upper end of the respective lower leg 11 and has a bottom provided with a snap-fit opening 15.

The lower support unit 1 further includes two pairs of control levers 14 each having a first end pivotally connected with a respective one of the joints 13 and a second end provided with a locking boss 142 extended through the arcuate slot 131 of the respective joint 13 and detachably locked in the elongate slot 112 of the respective lower leg 11. Two pairs of pins 141 each extend through a respective one of the control levers 14, a respective one of the joints 13 and the elongate slot 112 of a respective one of the lower legs 11 to connect the respective control lever 14, the respective joint 13 and the respective lower leg 11. Thus, each of the lower legs 11 of the lower support unit 1 is pivotally connected with the respective joint 13 by the respective pin 141 and is pivotable about the respective pin 141, and each of the control levers 14 of the lower support unit 1 is pivotally connected with the respective joint 13 by the respective pin 141 and is pivotable about the respective pin 141. In addition, each of the lower legs 11 of the lower support unit 1 is pivoted toward the respective joint 13 and is snapped into and folded by the snap-fit opening 15 of the respective joint 13.

Each of the position adjusting units 2 includes a movable block 21 movably mounted on a respective one of the support rods 16 of the lower support unit 1, a press knob 23 pivotally mounted on the movable block 21, a positioning stub 231 mounted on the press knob 23 and detachably locked in one of the positioning holes 17 of the respective support rod 16, a torsion spring 25 biased between the movable block 21 and the press knob 23, and a shaft 24 extended through the movable block 21, the press knob 23 and the torsion spring 25 to connect the movable block 21, the press knob 23 and the torsion spring 25.

The movable block 21 of each of the position adjusting units 2 is provided with a through hole 22 mounted on the respective support rod 16 of the lower support unit 1. The press knob 23 of each of the position adjusting units 2 is pushed by the torsion spring 25 to move the positioning stub 231 toward the positioning holes 17 of the respective support rod 16.

Each of the angle adjusting units 3 includes a housing 31 secured on the movable block 21 of a respective one of the position adjusting units 2 and provided with a first toothed groove 32, a rotation block 33 rotatably connected with the housing 31 and provided with a second toothed groove 34, a toothed wheel 35 intermeshing with the first toothed groove 32 of the housing 31 and the second toothed groove 34 of the rotation block 33, a compression spring 36 biased between the housing 31 and the toothed wheel 35 to locate the toothed wheel 35 between the first toothed groove 32 of the housing 31 and the second toothed groove 34 of the rotation block 33, a push button 37 movably mounted on the rotation block 33 and provided with at least one pushing tang 371 abutting the toothed wheel 35, and a mounting tube 38 secured on the rotation block 33.

The housing 31 of each of the angle adjusting units 3 is located above the movable block 21 of the respective position adjusting unit 2. The first toothed groove 32 of the housing 31 of each of the angle adjusting units 3 has an annular shape. The second toothed groove 34 of the rotation block 33 of each of the angle adjusting units 3 has an annular shape. The toothed wheel 35 of each of the angle adjusting units 3 is located between the compression spring 36 and the rotation block 33. The compression spring 36 of each of the angle adjusting units 3 is received in the housing 31. The compression spring 36 and the toothed wheel 35 of each of the angle adjusting units 3 are disposed between the housing 31 and the rotation block 33. The pushing tang 371 of the push button 37 of each of the angle adjusting units 3 extends through the rotation block 33 and is movable to push and detach the toothed wheel 35 from the second toothed groove 34 of the rotation block 33 to unlock the rotation block 33 from the toothed wheel 35, so that the rotation block 33 is rotatable freely relative to the housing 31.

Each of the upper support bars 4 has a substantially inverted U-shaped profile and has two opposite ends 41 each connected with the mounting tube 38 of a respective one of the angle adjusting units 3. Each of the two opposite ends 41 of each of the upper support bars 4 is provided with a plug 42 inserted into the mounting tube 38 of the respective angle adjusting unit 3.

In assembly, the press knob 23 and the torsion spring 25 of each of the position adjusting units 2 are connected with the movable block 21 by the shaft 24. The through hole 22 of the movable block 21 of each of the position adjusting units 2 is mounted on the respective support rod 16 of the lower support unit 1. At this time, the positioning stub 231 of each of the position adjusting units 2 is locked in one of the positioning holes 17 of the respective support rod 16. The compression spring 36 and the toothed wheel 35 of each of the angle adjusting units 3 are placed into the first toothed groove 32 of the housing 31. The rotation block 33 of each of the angle adjusting units 3 is pivotally connected with the housing 31 by a pin. At this time, the toothed wheel 35 of each of the angle adjusting units 3 is pushed by the compression spring 36 to intermesh with the first toothed groove 32 of the housing 31 and the second toothed groove 34 of the rotation block 33. The push button 37 of each of the angle adjusting units 3 is placed into the rotation block 33, with the pushing tang 371 extending through the rotation block 33 and abutting the toothed wheel 35. The plug 42 of each of the two opposite ends 41 of each of the upper support bars 4 is inserted into the mounting tube 38 of the respective angle adjusting unit 3. Each of the lower legs 11 of the lower support unit 1 is connected with the respective conic stand 111. Then, each of the connecting rods 12 of the lower support unit 1 is connected between any two of the lower legs 11. Each of the joints 13 of the lower support unit 1 is mounted on the upper end of the respective lower leg 11. Each of the pins 141 is extended through the respective control lever 14, the respective joint 13 and the elongate slot 112 of the respective lower leg 11 to connect the respective control lever 14, the respective joint 13 and the respective lower leg 11, so that each of the lower legs 11 and each of the control levers 14 of the lower support unit 1 are pivotally connected with the respective joint 13 by the respective pin 141. At this time, the locking boss 142 of each of the control levers 14 is extended through the arcuate slot 131 of the respective joint 13 and detachably locked in the elongate slot 112 of the respective lower leg 11.

As shown in FIG. 2, an infant car seat 5 is placed between the upper support bars 4, so that the infant car seat 5 is supported by the carrier. In addition, the carrier can be used indoors and outdoors.

Figure 4:
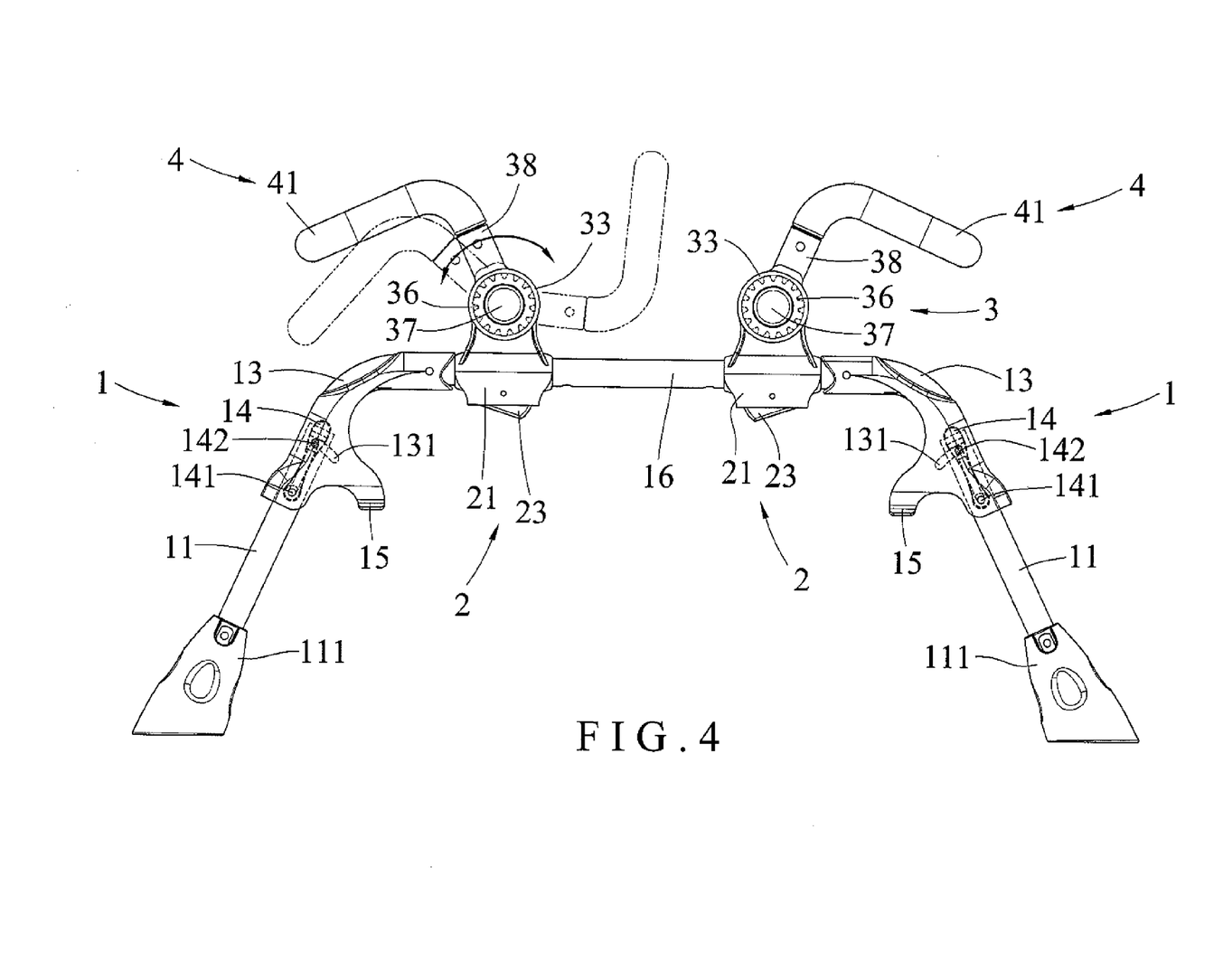
FIG. 4 is a schematic operational view of the carrier for an infant car seat as shown in FIG. 2.
Figure 5:
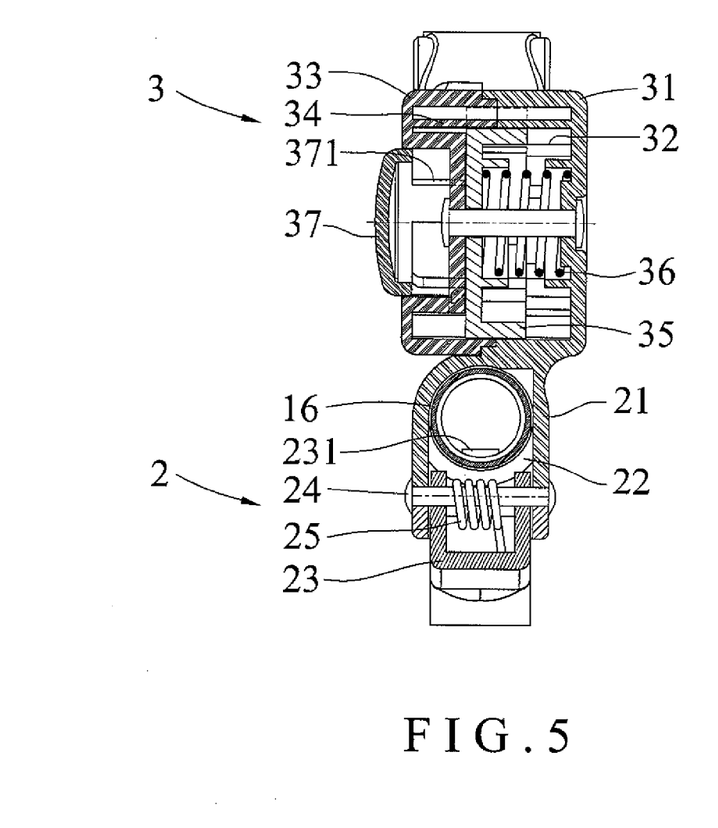
FIG. 5 is a partially side cross-sectional view of the carrier for an infant car seat as shown in FIG. 1.
Figure 6:
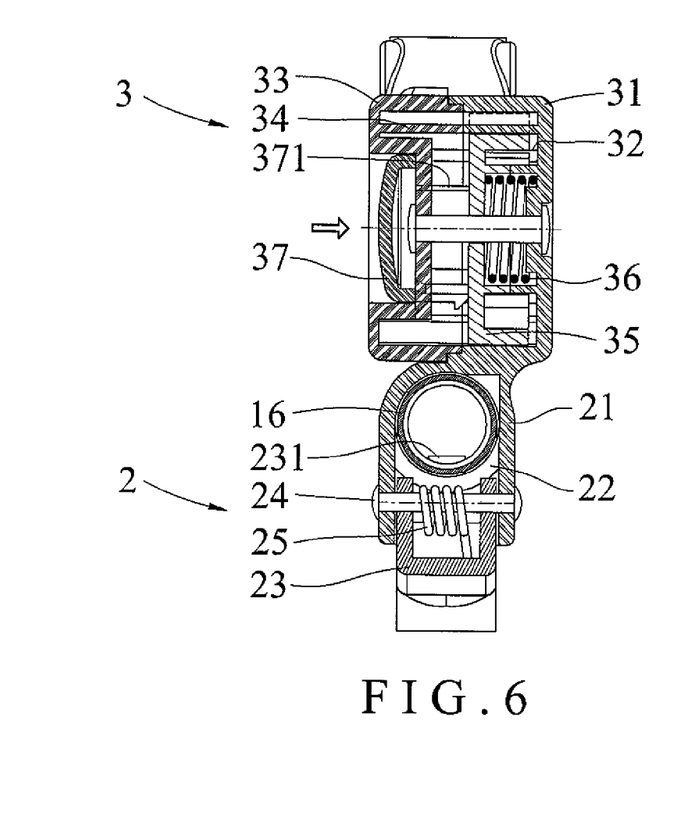
FIG. 6 is a schematic operational view of the carrier for an infant car seat as shown in FIG. 5.

In operation, referring to FIGS. 4-6 with reference to FIGS. 1-3, the toothed wheel 35 of each of the angle adjusting units 3 is pushed by the compression spring 36 to intermesh with the first toothed groove 32 of the housing 31 and the second toothed groove 34 of the rotation block 33 as shown in FIG. 5 so that the rotation block 33 of each of the angle adjusting units 3 is locked onto the housing 31 by the toothed wheel 35 and cannot be rotated any more. When the push button 37 of each of the angle adjusting units 3 is pressed inward, the pushing tang 371 of the push button 37 is moved to push and detach the toothed wheel 35 from the second toothed groove 34 of the rotation block 33 as shown in FIG. 6 to unlock the rotation block 33 from the toothed wheel 35, so that the rotation block 33 can be rotated freely relative to the housing 31 to adjust the angle of each of the upper support bars 4 as shown in FIG. 4. In such a manner, the angle of each of the upper support bars 4 can be adjusted freely to adjust the angle of the infant car seat 5.

Figure 7:
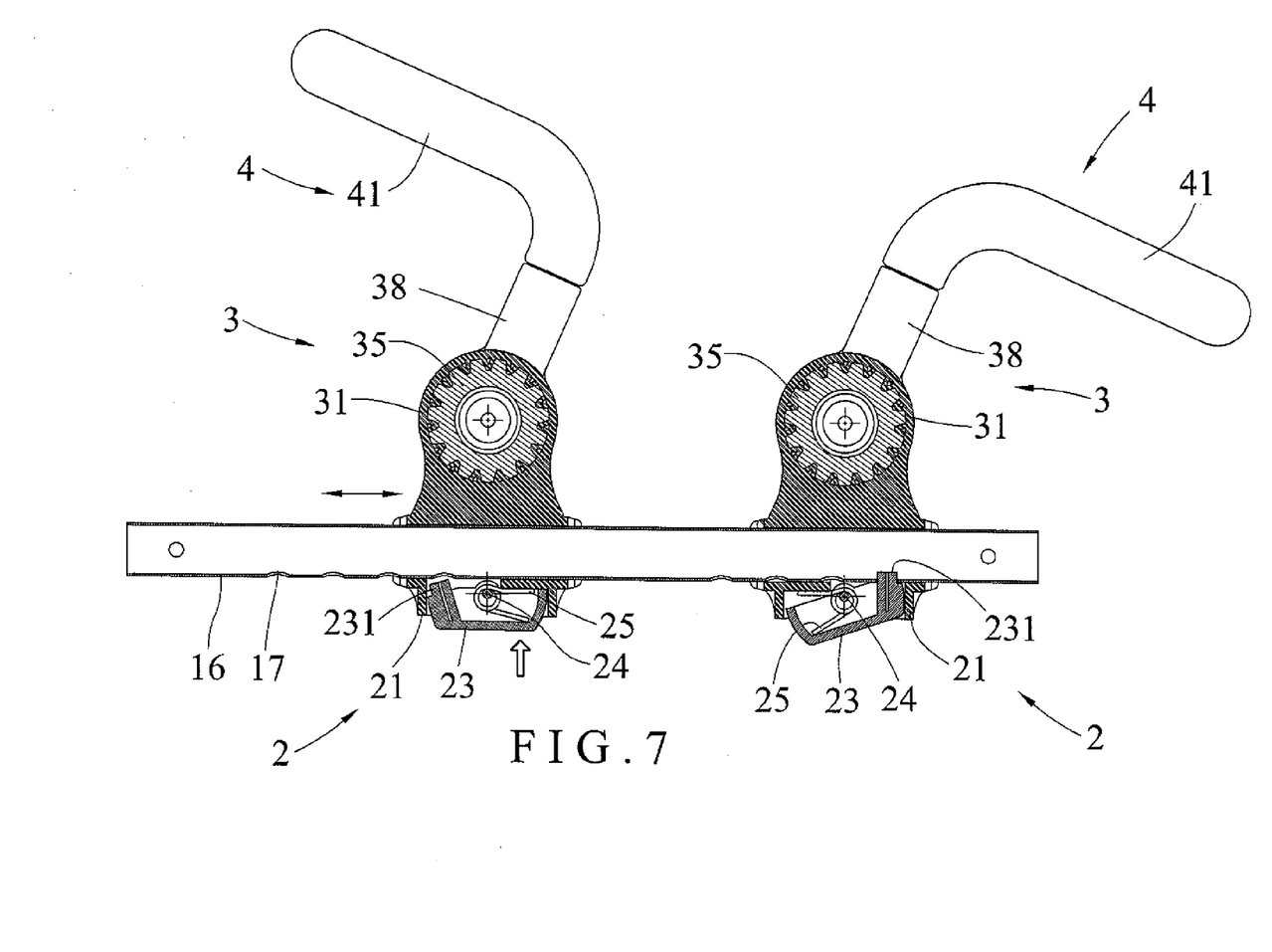
FIG. 7 is a partially front cross-sectional operational view of the carrier for an infant car seat as shown in FIG. 1.

Alternatively, referring to FIG. 7 with reference to FIGS. 1-3, the press knob 23 of each of the position adjusting units 2 is pushed and pivoted outward by the torsion spring 25 to move the positioning stub 231 toward the positioning holes 17 of the respective support rod 16, so that the positioning stub 231 is locked in one of the positioning holes 17 of the respective support rod 16 at a normal state to lock the movable block 21 onto the respective support rod 16. When the press knob 23 of each of the position adjusting units 2 is pressed and pivoted inward, the positioning stub 231 is detached from one of the positioning holes 17 of the respective support rod 16 to unlock the movable block 21 from the respective support rod 16, so that the movable block 21 can be moved freely on the respective support rod 16. In such a manner, the movable block 21 of each of the position adjusting units 2 is moved on the respective support rod 16 of the lower support unit 1 to move and adjust the position of each of the upper support bars 4, so that the upper support bars 4 are moved relative to each other to adjust the distance between the upper support bars 4 to fit the size of the infant car seat 5.

Figure 8:
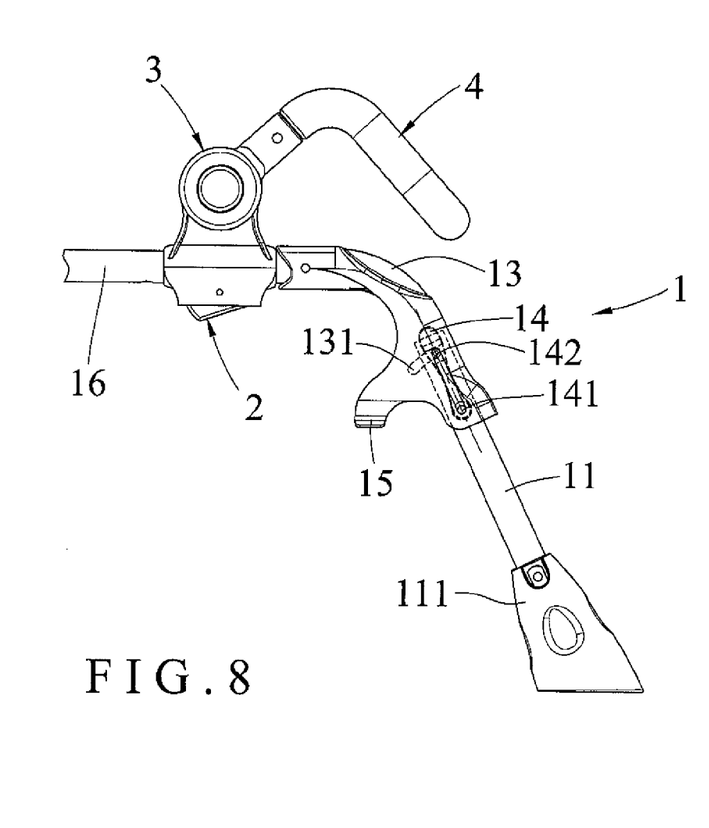
FIG. 8 is a partially front view of the carrier for an infant car seat as shown in FIG. 1.
Figure 9:
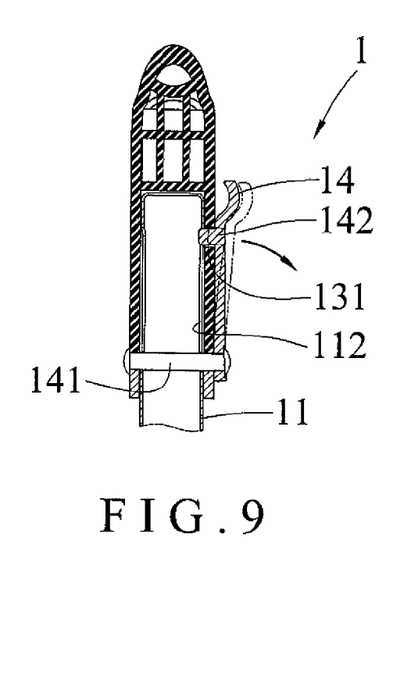
FIG. 9 is a partially side cross-sectional operational view of the carrier for an infant car seat as shown in FIG. 8.
Figure 10:
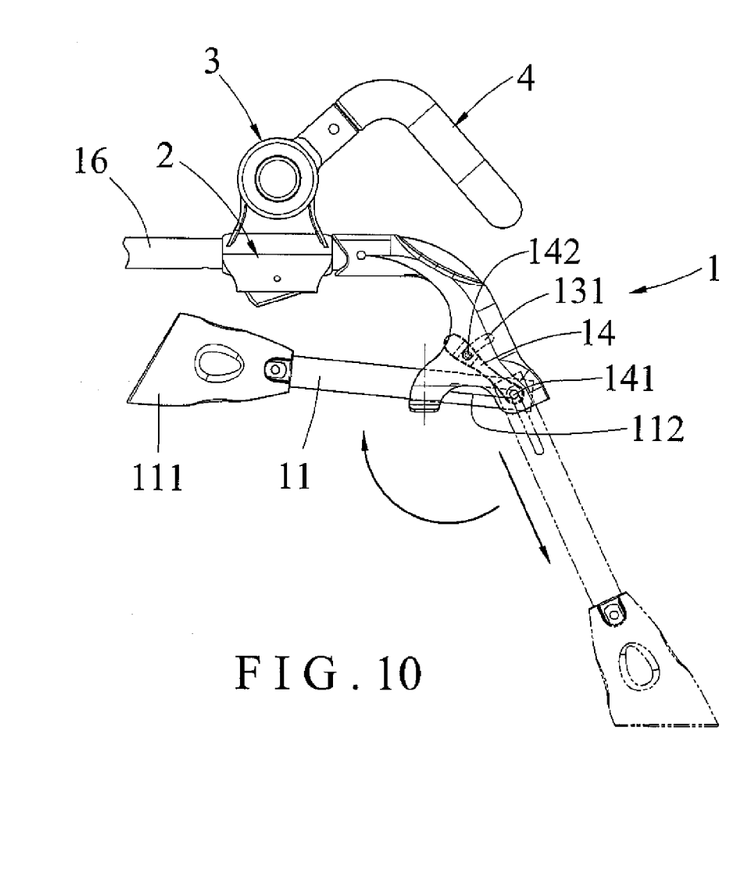
FIG. 10 is a schematic operational view of the carrier for an infant car seat as shown in FIG. 8.
Figure 11:
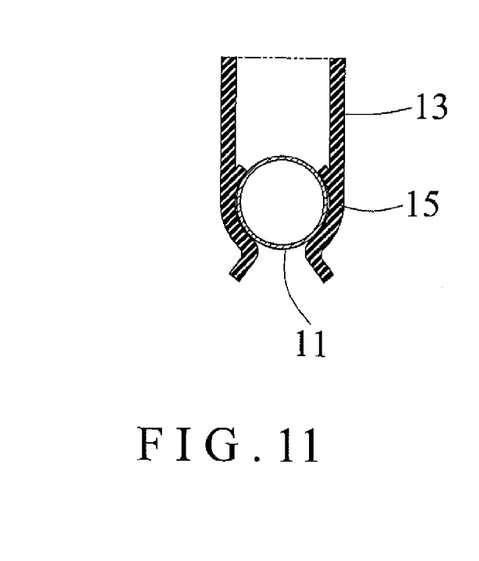
FIG. 11 is a partially side cross-sectional operational view of the carrier for an infant car seat as shown in FIG. 10.

Alternatively, referring to FIGS. 8-11 with reference to FIGS. 1-3, each of the lower legs 11 of the lower support unit 1 is pivotally connected with the respective joint 13 by the respective pin 141, while the locking boss 142 of each of the control levers 14 is extended through the arcuate slot 131 of the respective joint 13 and locked in the elongate slot 112 of the respective lower leg 11, so that the respective lower leg 11 is locked onto the respective joint 13 by each of the control levers 14 as shown in FIG. 8. When each of the control levers 14 is pulled outward as shown in FIG. 9, the locking boss 142 of each of the control levers 14 is detached from the elongate slot 112 of the respective lower leg 11 to unlock the respective lower leg 11 from the respective joint 13, so that the respective lower leg 11 can be pivoted relative to the respective joint 13. In such a manner, each of the lower legs 11 of the lower support unit 1 is pivoted upward toward the respective support rod 16 as shown in FIG. 10, and is snapped into and clamped by the snap-fit opening 15 of the respective joint 13 as shown in FIG. 11. Thus, each of the lower legs 11 of the lower support unit 1 can be folded when not in use to reduce the whole volume of the carrier.

Accordingly, the carrier is used to fix and support the infant car seat 5 and can be placed indoors and outdoors, thereby facilitating a user carrying and placing the infant car seat 5. In addition, the carrier can be directly taken out of the car to support the infant car seat 5, so that the user can place and carry the infant car seat 5 easily and conveniently. Further, the angle of each of the upper support bars 4 can be adjusted freely to adjust the angle of the infant car seat 5. Further, the upper support bars 4 are moved to adjust the distance between the upper support bars 4 to fit the size of the infant car seat 5. Further, each of the lower legs 11 of the lower support unit 1 can be folded to reduce the whole volume of the carrier when not in use.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A carrier for an infant car seat, comprising:
 a lower support unit;
 two pairs of position adjusting units connected with the lower support unit;
 two pairs of angle adjusting units connected with the two pairs of position adjusting units; and
 a pair of upper support bars connected with the two pairs of angle adjusting units;
wherein:
 the lower support unit includes:
  two pairs of lower legs;
  two pairs of joints each connected with a respective one of the two pairs of lower legs; and
  a pair of support rods each having two opposite ends each connected with a respective one of the two pairs of joints;
 each of the pair of support rods of the lower support unit has a surface provided with a plurality of positioning holes;
 each of the two pairs of position adjusting units includes:
  a movable block movably mounted on a respective one of the pair of support rods of the lower support unit;
  a press knob pivotally mounted on the movable block;
  a positioning stub mounted on the press knob and detachably locked in one of the plurality of positioning holes of the respective support rod;
  a torsion spring biased between the movable block and the press knob; and
  a shaft extended through the movable block, the press knob and the torsion spring;
 the movable block of each of the two pairs of position adjusting units is provided with a through hole mounted on the respective support rod of the lower support unit;
 the press knob of each of the two pairs of position adjusting units is pushed by the torsion spring to move the positioning stub toward the plurality of positioning holes of the respective support rod;
 each of the two pairs of angle adjusting units includes;
  a housing secured on the movable block of a respective one of the two pairs of position adjusting units and provided with a first toothed groove;
  a rotation block rotatably connected with the housing and provided with a second toothed groove;
  a toothed wheel intermeshing with the first toothed groove of the housing and the second toothed groove of the rotation block;
  a compression spring biased between the housing and the toothed wheel to locate the toothed wheel between the first toothed groove of the housing and the second toothed groove of the rotation block;
  a push button movably mounted on the rotation block and provided with at least one pushing tang abutting the toothed wheel; and
  a mounting tube secured on the rotation block;
 the compression spring and the toothed wheel of each of the two pairs of angle adjusting units are disposed between the housing and the rotation block; and
 each of the pair of upper support bars has two opposite ends each connected with the mounting tube of a respective one of the two pairs of angle adjusting units.

2. The carrier for an infant car seat of claim 1, wherein:
each of the lower legs of the lower support unit has a tubular shape;
each of the two pairs of lower legs of the lower support unit has an upper end provided with an elongate slot;
each of the two pairs of joints of the lower support unit has a surface provided with an arcuate slot connected to the elongate slot of the respective lower leg;
each of the two pairs of joints of the lower support unit has a bottom provided with a snap-fit opening;
the lower support unit further includes:
  two pairs of control levers each having a first end pivotally connected with a respective one of the two pairs of joints and a second end provided with a locking boss extended through the arcuate slot of the respective joint and detachably locked in the elongate slot of the respective lower leg; and
  two pairs of pins each extended through a respective one of the two pairs of control levers, a respective one of the two pairs of joints and the elongate slot of a respective one of the two pairs of lower legs to connect the respective control lever, the respective joint and the respective lower leg;
each of the two pairs of lower legs of the lower support unit is pivoted toward the respective joint and is snapped into and folded by the snap-fit opening of the respective joint;
each of the two pairs of lower legs of the lower support unit is pivotally connected with the respective joint by the respective pin and is pivotable about the respective pin; and
each of the two pairs of control levers of the lower support unit is pivotally connected with the respective joint by the respective pin and is pivotable about the respective pin.

3. The carrier for an infant car seat of claim 1, wherein each of the two pairs of lower legs of the lower support unit has a lower end provided with a conic stand.

4. The carrier for an infant car seat of claim 1, wherein the lower support unit further includes a pair of connecting rods each having two opposite ends each connected with a respective one of the two pairs of lower legs.

5. The carrier for an infant car seat of claim 1, wherein:
the housing of each of the two pairs of angle adjusting units is located above the movable block of the respective position adjusting unit;
the at least one pushing tang of the push button of each of the two pairs of angle adjusting units extends through the rotation block and is movable to push and detach the toothed wheel from the second toothed groove of the rotation block; and
each of the two opposite ends of each of the pair of upper support bars is provided with a plug inserted into the mounting tube of the respective angle adjusting unit.

6. The carrier for an infant car seat of claim 1, wherein each of the pair of upper support bars has a substantially inverted U-shaped profile.

* * * * *